Figure 1:
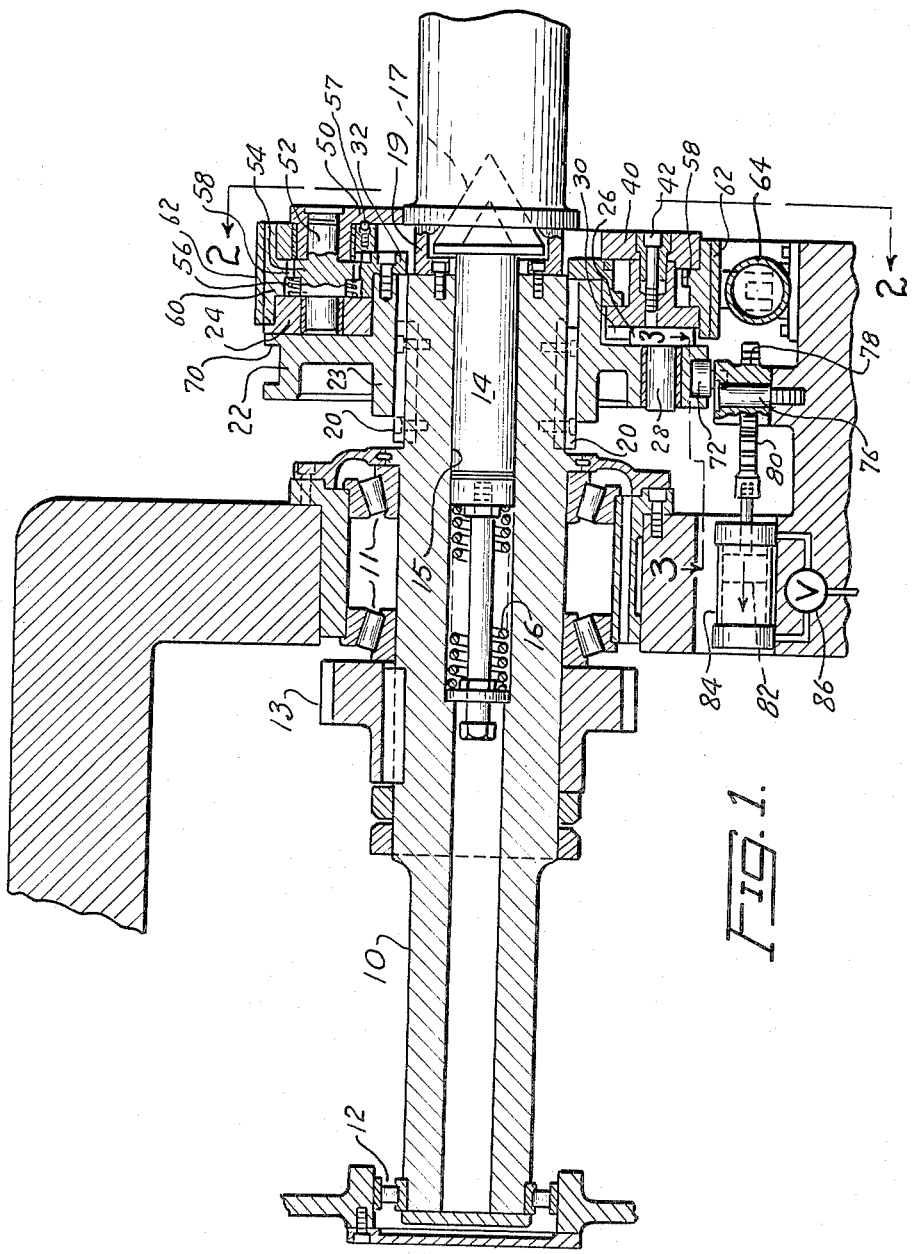

March 23, 1954

O. E. SCHURR 2,672,780

LATHE CHUCKING MECHANISM

Filed Aug. 21, 1948

2 Sheets—Sheet 1

INVENTOR.
Otto E. Schurr

BY

Owen & Owen

ATTORNEYS

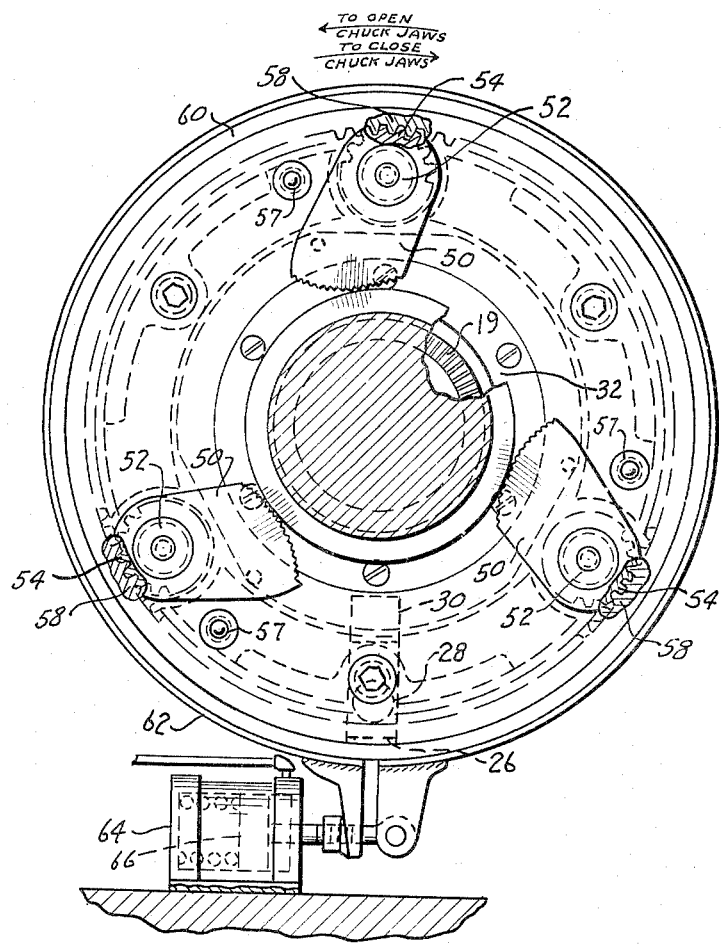
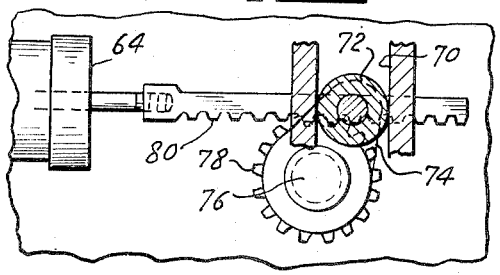

Patented Mar. 23, 1954

2,672,780

UNITED STATES PATENT OFFICE 2,672,780

LATHE CHUCKING MECHANISM

Otto E. Schurr, Hamilton, Ohio, assignor, by mesne assignments, to Baldwin-Lima-Hamilton Corporation, a corporation of Pennsylvania Application August 21, 1948, Serial No. 45,517

3 Claims. (Cl. 82—40)

This invention relates to a chucking mechanism for lathes and is particularly directed to a device capable of securely holding and driving large work pieces such as railway axles and journals for complete machining.

The primary object of the invention is to provide a novel work-retaining and driving mechanism in which the work is held very rigidly during the major portion of the machining operation by gripping jaws and in which the work holding jaws are subsequently moved axially out of engagement with the work during a finishing operation, the work being then held and driven by frictional engagement with other means.

Another object of the invention is to provide a work-retaining and driving mechanism which is rapid and positive in operation and which is capable of simple adjustment and maintenance.

Another object of the invention is to provide a work-retaining and driving mechanism for lathes or similar machine tools in which the work engaging members are moved into positive engagement with the work during a preliminary chucking operation and urged constantly against the work by the driving forces existing during machining.

Other objects and advantages will become apparent from the following detailed description of a preferred embodiment of the invention, reference being had to the accompanying drawings in which—

Fig. 1 is a central vertical sectional view of a work chuck embodying the present invention, a work piece being shown in engaged position; Fig. 2 is a section on line 2—2 of Fig. 1; and Fig. 3 is a fragmentary section on line 3—3 of Fig. 1.

Referring to the drawings, the present invention is shown applied to a lathe specifically designed for the machining of railway car axles and journals, a work piece being shown chucked in position. The lathe structure per se is not shown since it may be of any conventional type, and the drive to the chuck mechanism may likewise be of any suitable type capable of variable speed operation in forward and reverse directions.

The chuck comprises a driving spindle 10 journaled in spaced bearings 11 in the lathe frame and further supported by an outboard bearing 12. The spindle carries a drive gear 13 between the bearings by which it is rotated as hereinafter described. A center 14 is mounted in a bore 15 in the spindle and is urged outwardly by a spring 16. The work engaging tip of the center 14 may take any desired conformation, or an adapter 17 may be fitted over the end of the center, the adapter being formed to engage a previously established surface in a work piece on its exterior and the center 14 on its interior.

Surrounding the center 14 and fixed to the end of spindle 10 is a cup-shaped stop ring 19 against which the end of the work bears when in machining position. In some instances it may be desirable to serrate the surface of the ring 19 or to cover it with a friction surface for better gripping engagement.

The outer end of spindle 10 is provided with a series of keys 20 which engage keyways in the interior of a chuck driving body 22 so that the driving body is free to be moved axially of the spindle, but is rotated positively therewith. The body 22 has an enlarged hub 23 surrounding the spindle.

The driving body 22 has a sliding driving connection with a ring 24 by means of a driving key 26 journaled at 28 in the body 22 and cooperating with a slot 30 in the ring. The ring is thus free to move slightly radially but is in all positions turned by key 26. The internal diameter of the ring is deliberately made slightly larger than the external diameter of the hub portion 23 of the driving ring 22 for purposes of providing eccentric motion when necessary.

The ring 24 is held against axial displacement relative to the hub portion of the driving ring by an annular stop and spacer member 32 fixed to the outer face of the hub 23. By properly dimensioning that portion of the spacer member which overlies the hub 23, any predetermined axial play may be permitted in ring 24, but in most instances this play is very slight, only enough to allow an unimpeded sliding movement of the ring radially of the driving body.

The ring 24 carries an outer face ring 40 which is fixed thereto by a plurality of studs 42 and the outer ring is thus drawn up against the spacer member 32 with any desired degree of pressure, but always light enough so that the parts can slide over the surfaces of the member 32. Journaled in the ring 40 and having a shaft extension into suitable journals in ring 24 are a plurality of work engaging jaws 50. Each jaw consists of a work engaging member keyed or otherwise fixed to a shaft 52 which is formed with an integral pinion 54 intermediate its ends. The shaft, and thus the jaw 50, is urged in one direction by a torsion spring 56. The pivotal axis of each jaw is so related to the length of the jaw that in use the axis lies rearwardly of the point of engagement of the jaw with the work.

There is thus set up a camming action in the jaw which tends to increase the gripping action on the work when driven in a counter-clockwise direction. If desired, the face of each jaw may be serrated. A detent 57 on the face of ring 40 may be used to hold the jaws in a disengaged position, the detent being of any suitable form, as for example a spring-pressed pin which enters a recess in the rear face of the jaw.

The jaw pinion 54 meshes with a ring gear 58 formed on the interior of a band 60 so that relative rotation between the band and pinion produces a rotation of the shaft 52 and thus of the jaw 50. It will thus be apparent that if the band 60 were held stationary while the spindle, driving body 22, and ring 24 were rotated, a rotation in the opposite direction would be produced in jaw 50.

A brake band 62 surrounds band 60 and is in close engagement with its outer surface and provision is made for clamping the brake band by any suitable means such as a pneumatic cylinder 64 in which piston 66 operates with one end of the piston being engaged with the brake band as indicated in Fig. 2. From an inspection of Fig. 2, it will be apparent that if the spindle and thus the ring 24 is rotated in a clockwise direction, a counterclockwise movement or closing movement will be imparted to the chuck jaws provided the ring gear 58 is clamped against movement. It will further be seen that if the relative motion is reversed, that is if the spindle and ring 24 are moved counterclockwise while the ring gear 58 is clamped against movement, the chuck jaws will be moved toward their opened or released position.

The driving body 22 is provided with an annular recess or track 70 in which a cam roller 72 is disposed, the cam roller being carried on the end of a crank body 74 the center of rotation of which consists of a pin 76 fixed to the lathe frame. The crank or eccentric 74 is rotated by any suitable means such as gear 78 formed in its outer surface, the gear having cooperating engagement with a rack 80 so that linear movement of the rack will impart rotation to the eccentric body 74 and thus a translation of the cam roller 72. Rack 80 is moved in either direction by a piston 82 working in a pneumatic cylinder 84. The cylinder 84 is double acting and air may be introduced into either end by a suitable control valve indicated generally at 86.

As above noted, the chucking mechanism of the present invention is particularly adapted to receive a work piece such as a railway car axle and journal. These pieces must be completely machined, and are provided with end recesses to receive the lathe centers. Under the present practice, a center drive lathe is used in most instances since present end drive lathes require that the work be machined on one end while driven from the opposite end and then removed and reinserted into the machine in the opposite direction so that the end previously being driven may be machined. By the present invention the necessity of the second set-up is removed.

The work piece is lowered into the lathe and engaged by the lathe centers in the usual manner by closing the tail stock. The end face of the work acts to compress the center spring until the cup-shaped stop ring 18 is brought against the end of the work.

Air pressure is then introduced into cylinder 64 and the brake band brought into clamping engagement with band 60 which is thus held against movement. The lathe driving motor is then rotated slowly in a direction to impart counterclockwise rotation to the spindle and through key 26 to ring 24 and all of the jaw positioning gears 78. The gears thus rotate the jaws out of engagement with detents 57 and into firm gripping engagement with the work. Once the jaws are in position, the air may be released from cylinder 64 so that band 60 is free to move. The torsion spring 56 holds the several jaws tightly against the work.

Since the work surface engaged by the jaws may not be concentric with the recess in which the center 14 is positioned, it will be apparent that some freedom of movement of the outer engaging members, or jaws, must be permitted as otherwise only a single jaw might engage a badly centered work piece. This freedom of movement is permitted by the clearance between the inner surface of ring 24 and the hub of drive ring 22, while driving engagement between these parts is maintained by key 26.

With the jaws in engagement, operation of the lathe may commence and since the points of engagement of the jaws are forwardly of the centers about which they are supported in the chuck face or ring 46, the jaws tend to cam themselves tightly against the work. The work being thus positively driven from the end, very heavy machining cuts may be taken. The finishing operation may continue until such time as the tool is ready to work the surface being gripped by the jaws. At this time the jaws are moved out of engagement with the work, being slid axially away therefrom. The sliding movement is imparted by cam 72 moved by rack 80 in response to pressure in cylinder 82. To cause this movement the operator opens valve 86, or this opening may be accomplished automatically in response to the position of the tool. During the axial release of the jaws, the drive ring slides along keys 26 and the remaining chuck parts move with it. The work remains in firm contact with the ring 19 and this engagement is sufficient to drive it during the light cuts necessary to finish the surfaces previously engaged by the jaws and to remove any score marks left thereby.

When machining is complete the operator, if desired, can remove the work, restore the parts to their initial position and again clamp the brake band 62. If he then rotates the free parts slowly in the direction noted in Fig. 2, he can rotate the jaws through their pinions and restore engagement with their holding detents 57. All air pressure may then be released.

While the invention has been disclosed in connection with a specific form and disposition of the parts, it will be apparent that numerous modifications and changes will suggest themselves to those skilled in the art. It should be expressly understood that such modifications and changes may be made without departing from the scope of the appended claims.

Having thus described my invention, what I claim as new and desire to secure by United States Letters Patent is:

1. Chucking apparatus for an end drive lathe comprising a driven spindle, a work engaging center carried by said spindle, a ring surrounding said spindle and frictionally engaging the end of the work, a drive ring keyed to said spindle for rotation therewith and slidable axially thereof and relatively thereto, a jaw holding member driven from said ring, jaws rotatably mounted in said last member and adapted to engage the work piece, means to rotate said jaws into and out of engagement with the work piece, and means connected to said drive ring to move said drive ring, the jaw holding member and said jaws axially and sufficiently to move the jaws past the end of the work whereby the work continues to be driven solely from said end engaging ring and center and the previously jaw-gripped end of the work is unobstructed for machining.

2. Apparatus in accordance with claim 1 in which the means to rotate said jaws into and out of engagement with the work comprises pinions carried by the jaws, a ring gear meshing with all of said pinions, and means to clamp said ring gear against rotation whereby rotation of said jaw holding member produces relative movement between said ring gear and pinions.

3. In a chucking apparatus for an end drive lathe comprising a driven spindle, centering means carried by said spindle for engaging the work and additional frictional means carried by said spindle for frictionally engaging the work, a drive ring keyed to said spindle for rotation therewith and slidable axially thereof and relatively thereto, a jaw holding member driven from said ring, jaws rotatably mounted in said last member and adapted to engage the work piece, means to rotate said jaws into and out of engagement with the work piece, and means connected to said drive ring to move said drive ring, the jaw holding member and said jaws axially and sufficiently to move the jaws past the end of the work whereby the work continues to be driven solely from said centering means and additional frictional means and the previously jaw-gripped end of the work is unobstructed for machining.

OTTO E. SCHURR.

References Cited in the file of this patent

UNITED STATES PATENTS

| Number | Name | Date |
| --- | --- | --- |
| 1,232,508 | Davidson | July 10, 1917 |
| 1,285,350 | Palmgren | Nov. 19, 1918 |
| 1,449,126 | Muller | Mar. 20, 1923 |
| 1,668,948 | Cole | May 8, 1928 |
| 1,829,619 | Svenson | Oct. 27, 1931 |
| 1,912,987 | Lonely | June 6, 1933 |
| 1,915,705 | Webb | June 27, 1933 |
| 2,505,007 | Rolland | Apr. 25, 1950 |

FOREIGN PATENTS

| Number | Country | Date |
| --- | --- | --- |
| 407,956 | Germany | Jan. 7, 1925 |